Figure 3:
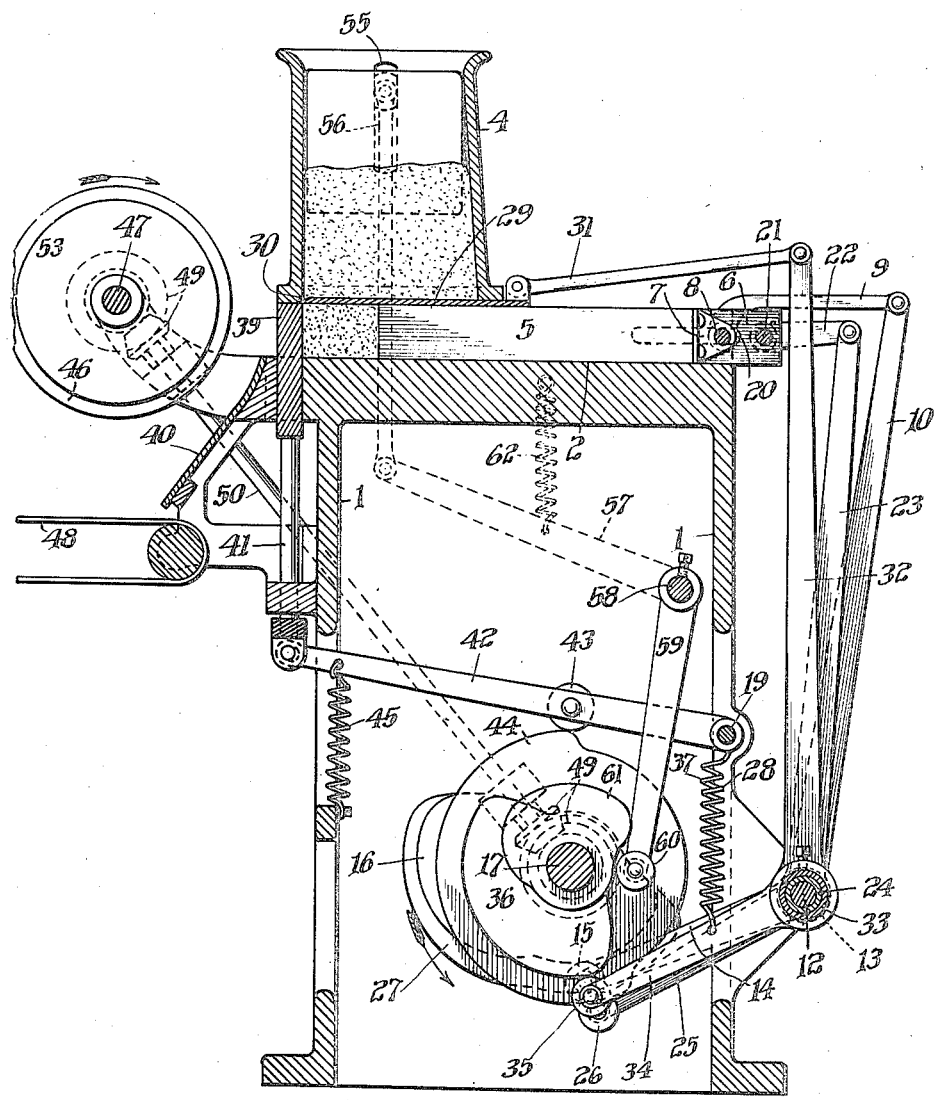

J. F. GEYER.
MOLDING MACHINE.
APPLICATION FILED MAY 25, 1915.
1,277,405.
Patented Sept. 3, 1918.
2 SHEETS—SHEET 1.
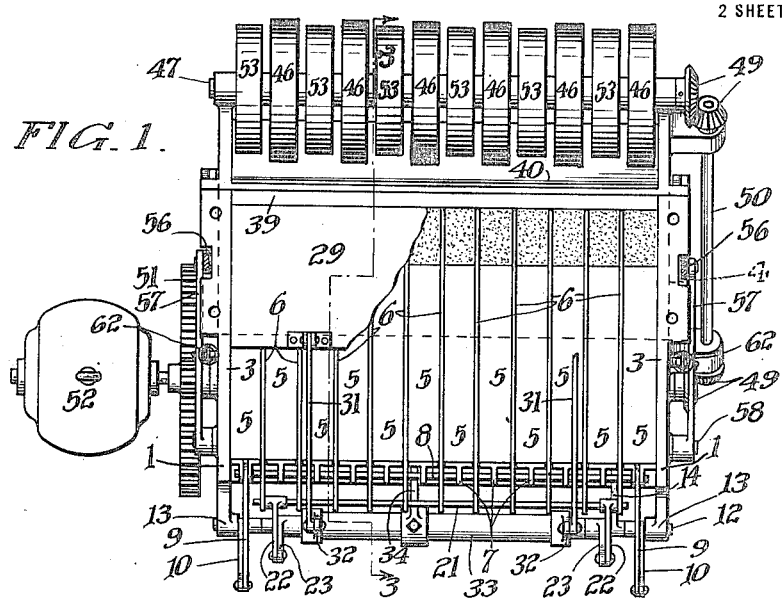
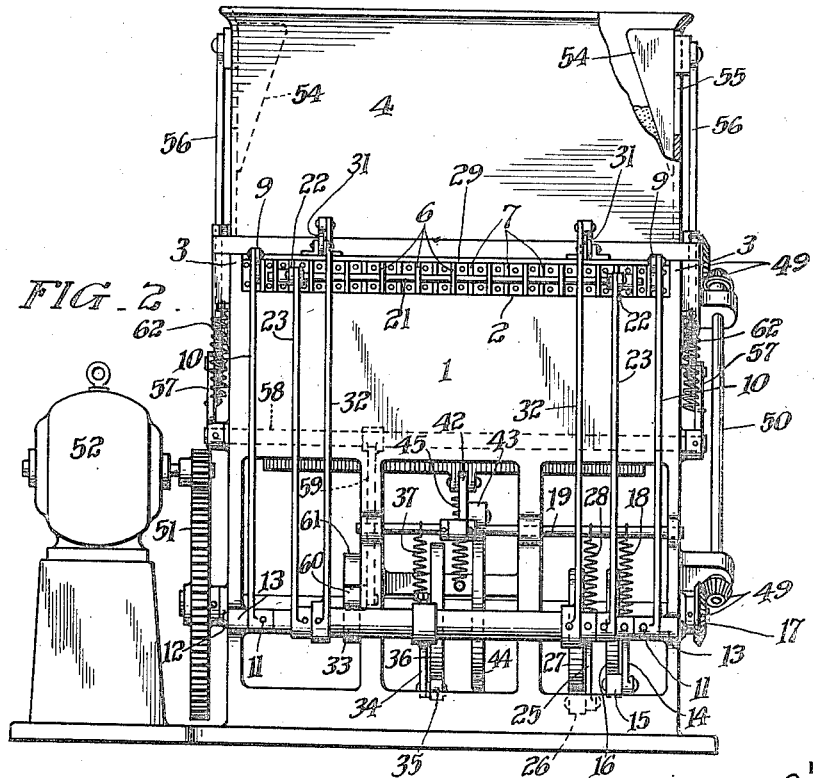
WITNESSES
INVENTOR
John F. Geyer
BY 
ATTORNEY

J. F. GEYER.
MOLDING MACHINE.
APPLICATION FILED MAY 25, 1915.

1,277,405.

Patented Sept. 3, 1918.
2 SHEETS—SHEET 2.

UNITED STATES PATENT OFFICE.

JOHN F. GEYER, OF PHILADELPHIA, PENNSYLVANIA.

MOLDING-MACHINE.

1,277,405.

Specification of Letters Patent.

Patented Sept. 3, 1918.

Application filed May 25, 1915. Serial No. 30,302.

*To all whom it may concern:*

Be it known that I, JOHN F. GEYER, a citizen of the United States, and resident of Philadelphia, county of Philadelphia, and State of Pennsylvania, have invented an Improvement in Molding-Machines, of which the following is a specification.

The object of the present invention is to provide a machine for automatically working dough or like plastic material into a molded form or forms of predetermined size and shape and delivering the separate molded forms. It has for a further object to provide a machine for feeding a quantity of material upon a suitable working surface, automatically dividing the quantity of material so fed into a plurality of separate smaller molded forms or bodies, and discharging the said severed molded bodies so made. My object is further to provide a dough molding machine with suction means which shall operate to cause the dough to be sucked or drawn into the mold space in a positive manner preliminary to its severance and subdivision.

With the above and other objects in view, the nature of which will be more fully understood from the description hereinafter, the invention consists in the novel construction of dough molding machine as hereinafter more fully described and defined in the claims.

Referring to the drawings:

Figure 1 represents a plan of a molding machine embodying my invention, certain parts being removed for clearness of illustration; Fig. 2 represents a side elevation of the same; and Fig. 3 represents a section on an enlarged scale taken on line 3—3 of Fig. 1.

1 designates a frame or body of the machine forming a top surface or table 2, which is bounded on two opposite sides by flanges 3 of the frame, said flanges forming supports for a hopper 4 and guides for certain movable adjuncts of the mechanism. 4 designates an open ended hopper for the material to be molded, the same being mounted upon the frame 1 in a suitable position in order that the material may be discharged upon the table 2 in the proper manner. From the foregoing it will be seen that the frame 1, hopper 4 and side flanges 3 provide a longitudinally disposed opening beneath the hopper into which the material is fed and wherein it may be molded into the desired shapes, after which it may be discharged to one side of the machine. In connection with the hopper construction it will be noted that a portion of the inner wall thereof is outwardly diverging or flared toward the discharge end in order to permit free feeding of the material by gravity and also to prevent any tendency of the material to adhere to the walls and choke the feeding action.

5 designates respectively a plurality of plungers mounted for sliding movement upon the table 2 and suitably spaced apart, so that between each pair of plungers there is a space of sufficient dimensions to permit the free reciprocation of the respective cutter blades 6. The plungers 5 are preferably provided respectively at one end with ears 7 which form a connection with a transversely disposed rod or bar 8 by means of which the said plungers 5 are connected together to be simultaneously moved from one position to another. The power transmitting devices for moving this rod consist of a pair of links 9 connected at one end respectively to the rod 8, and at the opposite end having hinged connection to a rock lever 10, which is secured by a set screw 11 or like means to a rock shaft 12 mounted in suitable bearings 13. The short arm 14 of the lever 10 carries a cam roller 15 adapted to bear against the face of a suitably shaped actuating cam 16 fixed to the main driving shaft 17, and is normally held in contact with its cam by means of a spring 18 connected between the said arm and the fixed rod 19.

The blade cutters 6 are respectively provided with a slot 20 within which the rod 8 operates, thereby providing for relative movement between the two sets of elements. These blade cutters 6 are all connected by a rod 21 extending transversely across their projecting ends and having connection by links 22 with a rock lever 23 mounted upon a sleeve 24 freely movable upon the rock shaft 12 to permit independent operation of the lever 23. The short arm 25 of the lever 23 carries a cam roller 26 adapted to contact with the face of the cam 27 and held in such engagement by the spring 28 or like means.

29 designates a horizontal knife, consisting of a substantially flat blade having bearing engagement with the plunger members 5 and having its cutting edge 30 arranged to pass beneath the hopper for the purpose of severing a quantity of the material from the main mass contained within the said hopper, This knife 29 is suitably connected to a pair of links 31 which in turn are pivotally connected to a rock lever 32 fixed to a sleeve 33 mounted upon the sleeve 24, the said sleeve 33 being independent of the sleeve 24 and adapted for free oscillating movement thereon and relative thereto.

The short arm 34 of the lever 23 carries a cam roller 35 adapted to contact with the cam surface of the cam 36 and is held in such position by a spring 37 or equivalent means. The cams 16, 27 and 36 for operating the respective levers, above described, are all mounted upon the main shaft 17 and keyed or otherwise secured thereto for the purpose of transmitting the required reciprocating movement to the parts controlled by the said levers. In the preferred embodiment of the invention I have shown the respective levers 23 and 32 fixed to the sleeve members by set screws, though it will be understood they may be keyed or otherwise secured thereto as desired.

39 designates a gate mounted for sliding movement at one end of the table 2 and adapted, in closed position, to form an abutment against which the material is pressed under the molding action, and in open position to form a discharge opening through which the material is delivered to the guide chute 40. The gate 39 in the present instance is guided through a portion of the frame 1, and has its stem 41 likewise suitably guided and connected to an operating arm 42 which is pivoted upon the rod 19. At a suitable intermediate point the arm 42 carries a cam roller 43 adapted to have contact engagement with a cam 44 also fixed upon the shaft 17, and held in operative contact by means of a spring 45.

Adjacent the discharge opening of the machine, and suitably spaced from the discharge chute 40, I have provided a plurality of sets of discharge rolls 46 and 53, both of which are keyed or otherwise secured for rotation with the countershaft 47. These feed rolls are arranged in spaced relation in order to provide spaces to receive the respective cutter blades 6 which project, at the end of the outward working stroke, beyond the end of the table for the purpose of maintaining the several molded forms separate and out of contact, as will be understood. The sets of feed rolls 46 and 53 are alternately arranged upon the shaft, so that those molded forms which are discharged from the machine opposite to the respective rolls 53 of smaller diameter are consequently engaged by these rolls after the remaining row of molded forms has been fed into contact with the rolls 46 of larger diameter. In this way the two sets of molded forms are discharged from the plungers and blades in succession and the first set is carried away before the second set is fully freed. While this interval of discharge between the two sets of molded forms is comparatively short, it is sufficient to insure one row being delivered to the conveyer 48 in advance of the second row, and thereby the opportunity for one molded form to come into adhering contact with an adjacent molded form is substantially eliminated. The object of thus separating the adjacent molded forms is, therefore, to prevent one molded form engaging or contacting with an adjacent molded form, which, in the case of plastic material, such as dough, would naturally cause the two contacting masses to adhere and destroy the effect of the individual molding operations preceding the delivery of the material.

The chute 40 is arranged to deposit the molded forms upon a suitable conveyer 48 located at a convenient point adjacent the end of the chute 40 and serves to deliver the molded material to a suitable point. The countershaft 47 is driven by means of the pinions 49 and shaft 50 from the main shaft 17, as will readily be understood. In Figs. 1 and 2, a gear 51 is shown fixed to the main driving shaft 17 and geared to a motor 52, though of course this is merely by way of example, and it will readily be understood that other means or devices may be employed for operating the main shaft.

In connection with the feeding of the material to the table it will be noted, by reference to Fig. 2, that I have provided feeders or push members at opposite sides of the hopper 4, each having connection through slots 55 in the hopper with separate operating rods 56 which are respectively connected to a crank arm 57 mounted for rocking movement upon the rock shaft 58, the movement of the rock arm being controlled by an arm 59 carrying a cam roller 60. This roller 60 is adapted to engage the surface of a cam 61 secured upon the shaft 17, the said cam being designed to operate the parts in suitable timed relation with the other adjuncts of the machine. A spring 62 is provided to normally return the feed members to their uppermost or initial position prior to beginning a working stroke. By reference to Fig. 3 it will be seen that the cam 61 is so arranged with respect to the cams controlling the cutter knife and the respective plungers and blades, that the feeder members 54 begin to work the material into position upon the table approximately at the time that the knife 29 is drawn back to uncover the bottom of the hopper. Furthermore, the return stroke of the plungers and blades is made simultaneously and since the gate valve 39 closes promptly as soon as these elements have passed the discharge opening, there will be a substantial suction in the space below the material in the hopper 4. This suction acts to draw the material into the plunger and blade space as the knife 29 opens, and consequently forms an auxiliary means for positively insuring proper and rapid feeding of the new batch of material to the table.

In the operation of the device, the actuation of the several parts of the machine, with respect to the relative timing of the movements, may be described as preferably taking place as follows: The dough or like material feeds by gravity to a position upon the table as soon as the plungers, cutter blades and severing knife have withdrawn to open the bottom or discharge end of the hopper. The mechanism controlling the cutter blades and plungers thereupon comes into operation to simultaneously move the several plungers 5 and cutter blades 6, the former substantially one half the distance across the bottom of the hopper and the latter entirely across (Fig. 1), thereby compressing the material which has been deposited upon the table and making it fill all the available space. The knife 29 then advances from one side of the hopper to the other, severing the compressed portion of the dough from the main supply in the hopper and completes the severance of the dough into separate bodies. When the cutter 29 has reached the extreme limit of its movement, the abutment or gate valve 39, which is of course operated in timed relation, moves down and thereby provides a discharge opening through which the severed and molded material passes under the movement of the plungers 5 and blades 6 which now receive another forward movement to complete the stroke. The cutter blades 6 come into operation at this time and move with the plungers through the discharging opening to support and keep the dough in separate bodies, but this movement is not as rapid as the movement of the plungers. In the final position of the parts the plungers 5 are close to abutting the periphery of the discharge rolls 46 and 53, while the knife blades 6 pass into the spaces between the rolls to insure complete separation of the molded bodies being acted upon. As soon as the rolls have fed the molded bodies to the chute, the plungers and cutter blades return to their initial position and are followed by the knife blade 29 which moves back to permit a new supply of material to drop upon the table as already described.

Since the knife 29 does not begin to open until the gate valve 39 is closed and the plungers and cutter blades have moved a substantial distance away from the gate valve, it will be seen that a chamber is formed below the hopper at the ends of the plungers and increasing in size as these elements continue their return stroke. The tendency, therefore, is to form a substantial vacuum in this chamber which, as the knife 29 opens, causes the material to be sucked into the space vacated by the plungers, so that a new batch of the material is in position to be worked.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to protect by Letters Patent is:—

1. In a molding machine, a frame forming a suitable table or work surface, a hopper arranged to deliver to said table a quantity of the material from the main supply contained in said hopper, horizontally reciprocating vertical blades for dividing the material in vertical planes into a plurality of partly separated bodies, a reciprocating horizontal blade for severing the partly divided material from the mass of material in the hopper and completing the division thereof into separate bodies, a compressing device for working the severed portion into molded form, an abutment arranged in opposed relation to said compressing device against which the material is compressed, and means for operating the severing means compressing device and the abutment.

2. In a molding machine, a frame forming a suitable table or work surface, a hopper arranged to deliver to said table a quantity of the material from the main supply contained in said hopper, horizontally reciprocating vertical blades for dividing the material in vertical planes into a plurality of partly separated bodies, a reciprocating horizontal blade for severing the partly divided material from the mass of material in the hopper and completing the division thereof into separate bodies, a compressing device for working the severed portion into molded form, an abutment arranged in opposed relation to said compressing device against which the material is compressed, and means operating in timed relation with respect to said severing means for controlling the actuation of said compressing device.

3. In a molding machine, a frame forming a suitable table or work surface, a hopper arranged to deliver to said table a quantity of the material from the main supply contained in said hopper, horizontally reciprocating vertical blades for dividing the material in vertical planes into a plurality of partly separated bodies, a reciprocating horizontal blade for severing the partly divided material from the mass of material in the hopper and completing the division thereof into separate bodies, a compressing device for working the severed portion into molded form, an abutment arranged in opposed relation to said compressing device against which the material is compressed, and means operating in timed relation with respect to said compressing device for controlling the actuation of said severing means.

4. In a molding machine, a frame forming a suitable table or work surface, a hopper arranged to deliver material to said table, means for partly dividing the material delivered from the hopper into partly separated bodies arranged side by side, a horizontal blade for severing the partly separated bodies from the mass of material in the hopper and completing the separation of the bodies, operating devices for actuating the horizontal blade and the means for partly dividing the material so that the latter operate in advance of the former at the initial act of dividing and severing and the former acts in advance of the latter in completing the final operation up to time of discharge of the bodies, compressing devices for working the separated bodies of material thus provided into molded form, an abutment arranged in opposed relation to said compressing devices, and means for shifting said abutment at a predetermined time to provide a discharge opening through which the means for partly dividing the material and the compressing devices pass in discharging the molded bodies.

5. In a molding machine, a frame forming a suitable table or work surface, a hopper arranged to deliver to said table a quantity of the material from the main supply contained in said hopper, horizontally reciprocating vertical blades for dividing the material in vertical planes into a plurality of partly separated bodies, a reciprocating horizontal blade for severing the partly divided material from the mass of material in the hopper and completing the division thereof into separate bodies, a compressing device for putting pressure upon the plurality of separate molded bodies, an abutment arranged in opposed relation to said compressing device, means for shifting said abutment at a predetermined time to provide a discharge opening for the molded material, and means located adjacent said discharge opening for discharging the molded material from the molding and cutting devices.

6. In a molding machine, a frame forming a suitable table or working surface, a hopper for delivering material to said table, a plurality of plungers mounted for sliding movement upon said table and adapted to work a portion of said material into molded form, an abutment located at the side of said hopper opposite from said plungers and adapted to coöperate with said plungers during the molding operation, cam controlled means common to all of said plungers for simultaneously actuating said plungers at a predetermined time, a plurality of vertically arranged cutter blades arranged to respectively interfit between said plungers and adapted to sever the material to be acted on by the plungers in vertical parallel planes, a knife blade mounted to move between said plungers and the vertically arranged cutter blades on the one hand and the lower end of said hopper on the other for severing a quantity of the material from the main supply in said hopper whereby separate bodies are formed, cam controlled means for operating said cutter and knife blades in timed relation with respect to said plungers, and means to move said abutment at a predetermined time to form a discharge opening through which the plungers and knife blades, together with the severed and molded material, pass and whereby the latter may be discharged from said machine.

7. In a molding machine, a frame forming a suitable table or working surface, a hopper for delivering material to said table, a plurality of plungers mounted side by side for sliding movement upon said table and adapted to work a portion of said material into molded form, an abutment located at the side of said hopper opposite from said plungers and adapted to coöperate with said plungers during the molding operation, cam controlled means common to all of said plungers for simultaneously actuating said plungers at a predetermined time, a plurality of vertically arranged cutter blades arranged to respectively interfit between said plungers and adapted to sever the material to be acted on by the plungers in vertical parallel planes, a knife blade mounted to move between said plungers and the lower end of said hopper for severing a quantity of the material from the main supply in said hopper whereby separate bodies are formed, cam controlled means for operating said cutter and knife blades in timed relation with respect to said plungers, means to move said abutment at a predetermined time to form a discharge opening through which the severed and molded material may be discharged from said machine, a plurality of discharging rolls arranged adjacent said discharge opening for discharging the molded bodies, a chute for delivering the molded bodies of material to a suitable point, and means for actuating said rolls to discharge the molded bodies from the molding plungers and blades.

8. In a molding machine, a frame forming a suitable table or working surface, a hopper for delivering material to said table, a plurality of parallel plungers mounted for sliding movement upon said table and adapted to work a portion of said material into molded form, an abutment located at the opposite side of said hopper from said plungers and adapted to coöperate with said plungers during the molding operation, cam controlled means common to all of said plungers for simultaneously actuating said plungers at a predetermined time, a plurality of vertically arranged cutter blades arranged to respectively interfit between said plungers and adapted to sever the material to be acted on by the plungers in vertical parallel planes, a knife blade mounted to move between said plungers and the lower end of said hopper for severing a quantity of the material from the main supply in said hopper whereby separate bodies are formed, cam controlled means for operating said cutter and knife blades in timed relation with respect to said plungers, means to move said abutment at a predetermined time to form a discharge opening through which the severed and molded material may be delivered from said machine, a plurality of discharge rolls arranged adjacent said discharge opening for discharging the molded bodies from the plungers and blades, said rolls being spaced apart and being respectively alined with said plungers, and the spaces between the rolls being respectively alined with said cutter blades whereby said cutters pass between the rolls to permit the molded bodies of material to be pressed against the rolls during the discharging operation.

9. In a molding machine, a frame forming a suitable table or working surface, a hopper mounted above said table and adapted to discharge material to said table, a horizontal knife blade slidably mounted at the bottom of the hopper, means to operate said knife blade, a plurality of parallel plungers slidably mounted upon said table and adapted to pass between the bottom of said knife blade and said table, cam controlled means common to all of said plungers for simultaneously imparting movement to said plungers, a plurality of vertically arranged cutters respectively arranged for sliding movement between the adjacent pairs of plungers, means permitting relative movement between said plungers and said cutters, cam controlled means common to all of said cutters for simultaneously moving said cutters in timed relation with respect to the movement of said plungers, an abutment arranged in opposed relation to said plungers and cutters, and means to shift said abutment at a predetermined time to form a discharge opening through which the plungers pass whereby the molded and severed bodies of material may be discharged.

10. In a molding machine, a frame forming a suitable table or working surface, a hopper for delivering material to said table, said hopper having an inner wall outwardly diverging with respect to the opposite wall of said hopper and toward the bottom thereof, means for severing a quantity of the material from the supply means for forming it into separate bodies, a compressing device for working the severed bodies into molded form, an abutment arranged in opposed relation to said compressing device, and means for shifting said abutment to provide a discharge outlet from said machine.

11. In a molding machine, a frame forming a suitable table or work surface, a hopper arranged to deliver material to said table, means for severing a quantity of the material from the main supply contained in said hopper, means for forming it into separate bodies, a compressing device for working the several bodies into molded form, an abutment arranged in opposed relation to said compressing device, means for shifting said abutment at a predetermined time to provide a discharge opening for the molded material, a shaft located adjacent the discharge opening, a plurality of sets of discharging rolls mounted upon said shaft one set having a different diameter than the other set and the rolls of the sets arranged in alternate relation, whereby a number of the molded forms are discharged from the machine in advance of the remaining molded forms.

12. In a molding machine, a frame forming a suitable table or work surface, a hopper arranged to deliver to said table a quantity of the material from the main supply contained in said hopper, means for dividing the material delivered to the table into separate bodies arranged side by side, a pressing device for working the several bodies into molded form, an abutment arranged in opposed relation to said compressing device, means for shifting said abutment at a predetermined time to provide a discharge opening for the molded material, and means located adjacent the discharge opening for discharging the molded bodies in two sets successively, the alternate bodies being simultaneously discharged at one time to constitute one set and then the remaining molded bodies simultaneously discharged as the other set.

13. In a molding machine, a frame forming a suitable table or work surface, a hopper arranged to deliver material to said table, means for severing a quantity of the material from the main supply contained in said hopper, means for dividing it in separate bodies, a compressing device for working the severed bodies into molded form, an abutment arranged in opposed relation to said compressing device, means to operate the abutment to permit discharge of the molded bodies, an auxiliary device located in said hopper and consisting of vertically reciprocating push blocks adjacent the walls of the hopper for feeding the material toward said table, and means for operating said auxiliary feeding mechanism in advanced timed relation with the operation of the severing means.

In testimony of which invention I hereunto set my hand.

JOHN F. GEYER.

Witnesses:
R. M. HUNTER,
E. W. SMITH.